United States Patent [19]
Kim et al.

[11] Patent Number: 5,457,669
[45] Date of Patent: Oct. 10, 1995

[54] PROGRAM SEARCH METHOD HAVING A USER-CONTROLLABLE SEARCH INTERVAL AND A USER-CONTROLLABLE REPRODUCTION PERIOD

[75] Inventors: Young-han Kim; Gyoung-chan Park; Yeon-taek Han, all of Suwon, Rep. of Korea

[73] Assignee: Samsung Electronics Co., Ltd., Kyungki-Do, Rep. of Korea

[21] Appl. No.: 268,324

[22] Filed: Jun. 30, 1994

[30] Foreign Application Priority Data

Jun. 30, 1993 [KR] Rep. of Korea .................. 1993-12236

[51] Int. Cl.$^6$ .............................................. G11B 17/22
[52] U.S. Cl. .............................................. 369/32; 369/54
[58] Field of Search .................................... 369/32, 44.28, 369/54, 44.27, 47, 48, 49; 360/10.1, 10.2, 11.1

[56] References Cited

U.S. PATENT DOCUMENTS

| | | | |
|---|---|---|---|
| 5,105,401 | 4/1992 | Aoyagi et al. | 369/32 |
| 5,126,987 | 6/1992 | Shiba et al. | 369/32 |
| 5,216,644 | 6/1993 | Shiba et al. | 369/32 |
| 5,270,988 | 12/1993 | Kobayashi | 369/32 |
| 5,363,354 | 11/1994 | Tabuchi | 369/32 |

FOREIGN PATENT DOCUMENTS 1128286  5/1989  Japan .

*Primary Examiner*—Georgia Y. Epps
*Assistant Examiner*—Tan Dinh
*Attorney, Agent, or Firm*—Sughrue, Mion, Zinn, Macpeak & Seas

[57] ABSTRACT

A program search method for a digital signal processor which can search a program irrespective of the presence or absence of chapter numbers indicating portions of a recorded program includes the steps for setting predetermined search interval and reproduction period according to respective external inputs, jumping from a present location by the predetermined search interval set in the setting step, reproducing the program from a recording medium for the predetermined reproduction period set during the setting step after performing the jumping step, and then repeatedly performing the jumping and reproducing steps. In contrast with the conventional method, the program search method performs search and intro functions by the set intervals, which are defined in terms of time or frame units. Thus, the multi-intro scan function can be performed even if there is no chapter number differentiation for each respective program.

15 Claims, 8 Drawing Sheets

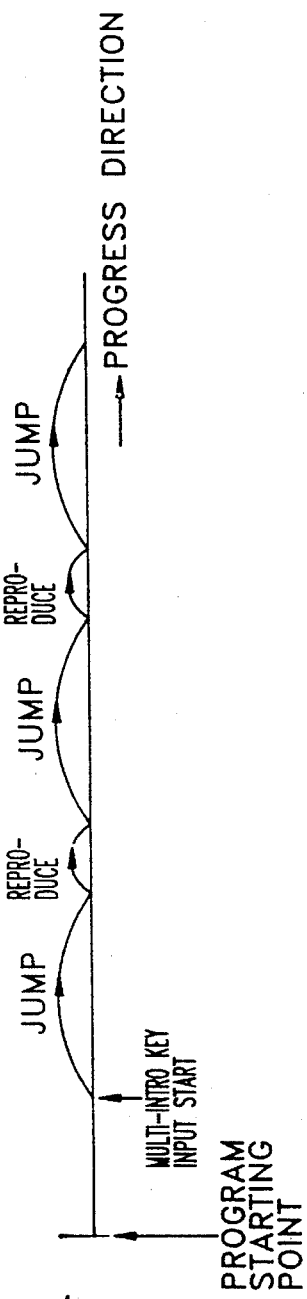
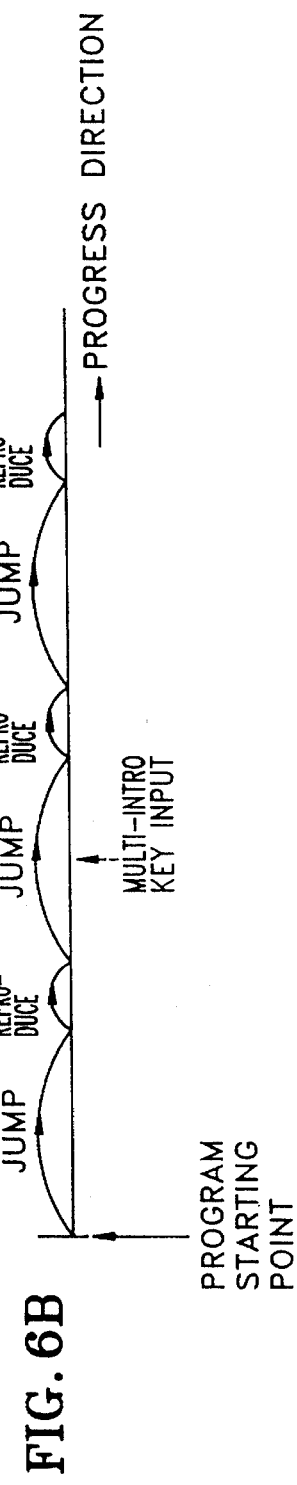
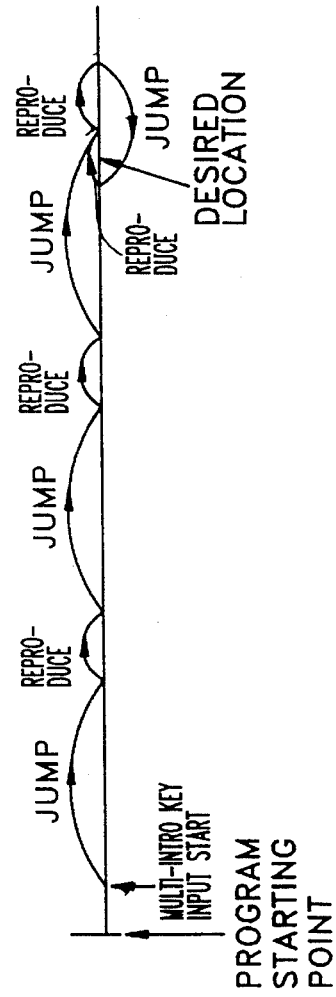

PROGRAM SEARCH METHOD HAVING A USER-CONTROLLABLE SEARCH INTERVAL AND A USER-CONTROLLABLE REPRODUCTION PERIOD

BACKGROUND OF THE INVENTION

1. Field of the Invention

The present invention relates to a program search method for a digital signal processor and, more particularly, to a program search method which can scan a program, irrespective of the presence or absence of chapter numbers indicating a specific portion of a program.

Korean Patent Application No. 93-12236 is incorporated herein by reference for all purposes.

2. Description of Related Art

In general, a digital signal processor processes signals including digital information, such as signals generated by a laser disk player (LDP), a compact disk player (CDP), a digital audio tape (DAT) recorder, a digital compact cassette (DCC) recorder, etc.

The digital signal processor can record onto a recording medium not only the digital data signal but also time information, i.e., the starting time or playing time of the program which is to be reproduced during the reproducing operation. Thus, the time information is recovered along with the digital data signal. This data signal is processed as a reproduction signal and is then output while the recovered time information can be conveyed to a user through a display such as a digitron.

Many forms of program search functions have been developed over the years. One such program search function reproduces only a part of the program content recorded on the recording medium. The partial program content is sufficient to allow the user to rapidly and precisely recognize the reproduced program. This known program search method, thus, can be performed by reproducing the corresponding program for a predetermined time, i.e., about ten to fifteen seconds measured from the reproduction starting point for each program recorded on the recording medium. This allows the user sufficient time to recognize the program being reproduced with the help of the time information.

An alternative program search function can be performed when multiple programs are recorded on the tracks of a disk and each program is separated from the previous program by a differentiating signal for differentiating the programs. These signals, which are loaded in a predetermined order on the horizontal synchronizing signal lines within a vertical blanking period, include chapter numbers, which are recorded for differentiating specific programs. When a search instruction key, e.g., an intro scan key, is operated and the differentiation signal recorded for indicating the first chapter (CH1) is detected, as shown in FIG. 1, the program is reproduced starting at the spot corresponding to the first chapter number for a predetermined time. Thereafter, the pickup is moved to the next chapter (CH2) and is used to reproduce the respective program for the predetermined time. Subsequently, the above-mentioned steps can be performed repeatedly.

For the disk type described immediately above, when a program such as a song, is stored on a laser disk along with a differentiation signal, i.e., the chapter number, which is recorded for differentiating each program, a program search function is easily performed. In contrast, when a long program such as a movie, i.e., one program, is recorded on a laser disk, since there is no need to record chapter numbers as differentiation signals for every predetermined period, chapter number search as well as other intro scan functions, cannot be performed during program reproduction. Since the differentiation of chapters by chapter numbers is impossible, it is increasingly difficult to search for the user's desired portion of a program.

An alternative program search method using a fast forward (FF) key or a rewind (REW) key is somewhat similar to the search methods already described. It will be noted that the program search method using fast forward or rewind functions requires too long a time to be of any practical use. Another form of program search method is frame detection. In this case, although frames are detected while the picture is viewed more rapidly than normal, such a program search method does not offer an appreciable advantage over the alternative program search methods described above.

Another known program search method utilizes the reproduction of a few bars beginning at the starting portion for a predetermined time so as to permit a program such as a song recorded on the disk to be recognized. However, since many songs begin with an undistinguishable prelude or introduction, this search method is insufficiently precise for recognition of a desired song. Therefore, even during a program search method utilizing the introduction of a song wherein the user optionally sets or defines a starting point for song reproduction which is offset from the starting point of a chapter, disks without chapter numbers are difficult to search for the desired song.

Additionally, in the CDP disclosed in U.S. Pat. No. 4,613,967, intermittent reproduction is performed by skipping disk tracks 50 times as fast as normal in a search mode conducted in either of the directions corresponding to the FF or REW modes of operation in order to reproduce information from nonadjacent tracks. This apparatus stores the reproduced signal temporarily and then outputs the stored signal while attenuating the reproduced signal so that the sound quality is not degraded as the program is reproduced intermittently.

SUMMARY OF THE INVENTION

The principal object of the present invention is to provide a program search method by which a user can search for a desired program irrespective of the presence or absence of chapter numbers indicating selected portions of a program generated by a digital signal reproducing apparatus.

Another object of the present invention is to provide a program search method by which a user can easily search for a program from a digital signal reproducing apparatus by reproducing portions of a program separated by a predetermined interval irrespective of the presence or absence of chapter numbers indicating selected portions of the program.

These and other objects, features and advantages according to the present invention are provided by a program search method for a digital signal processor which reproduces the program recorded on a recording medium. The method advantageously includes steps for setting a predetermined search interval and reproduction period according to respective external inputs, jumping from the present location by the predetermined search interval, reproducing the program stored on the recording medium for the predetermined reproduction period, and repeatedly performing the jumping and reproducing steps.

These and other objects, features and advantages of the invention are disclosed in or will be apparent from the following description of preferred embodiments.

BRIEF DESCRIPTION OF THE DRAWINGS

The preferred embodiments are described with reference to the drawings, in which like elements are denoted by like or similar numbers, and in which:

FIGS. 6A and 6B are illustrations which are useful in understanding the flowchart for the program search method shown in FIG.

FIG. 9 is an illustration which is useful in understanding the program search methods according to the flowcharts of FIGS. 7 and 8.

DETAILED DESCRIPTION OF THE PREFERRED EMBODIMENTS

Figure 1:
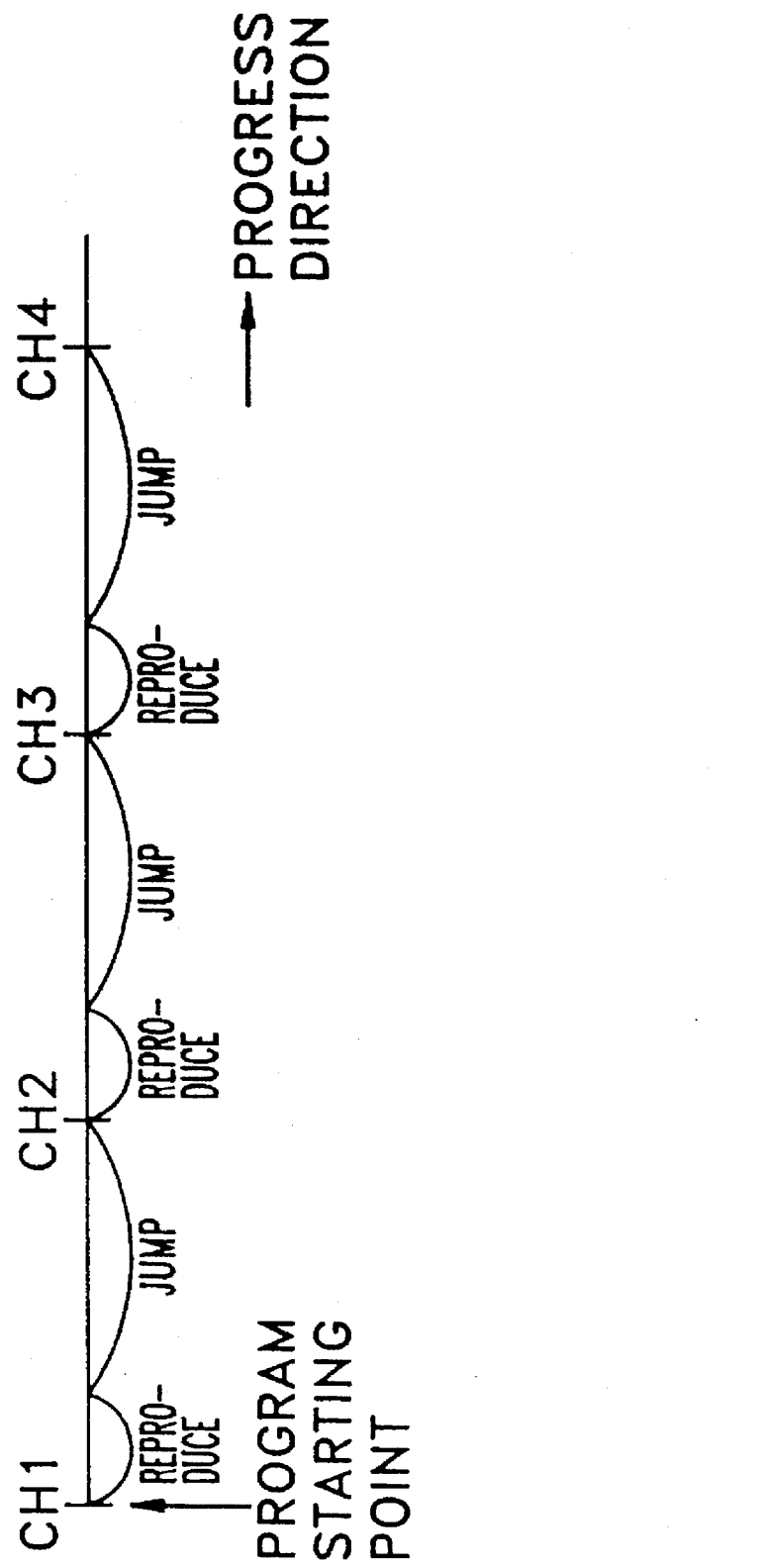
FIG. 1 is an illustration which is useful in understanding a conventional program search method.
Figure 2:
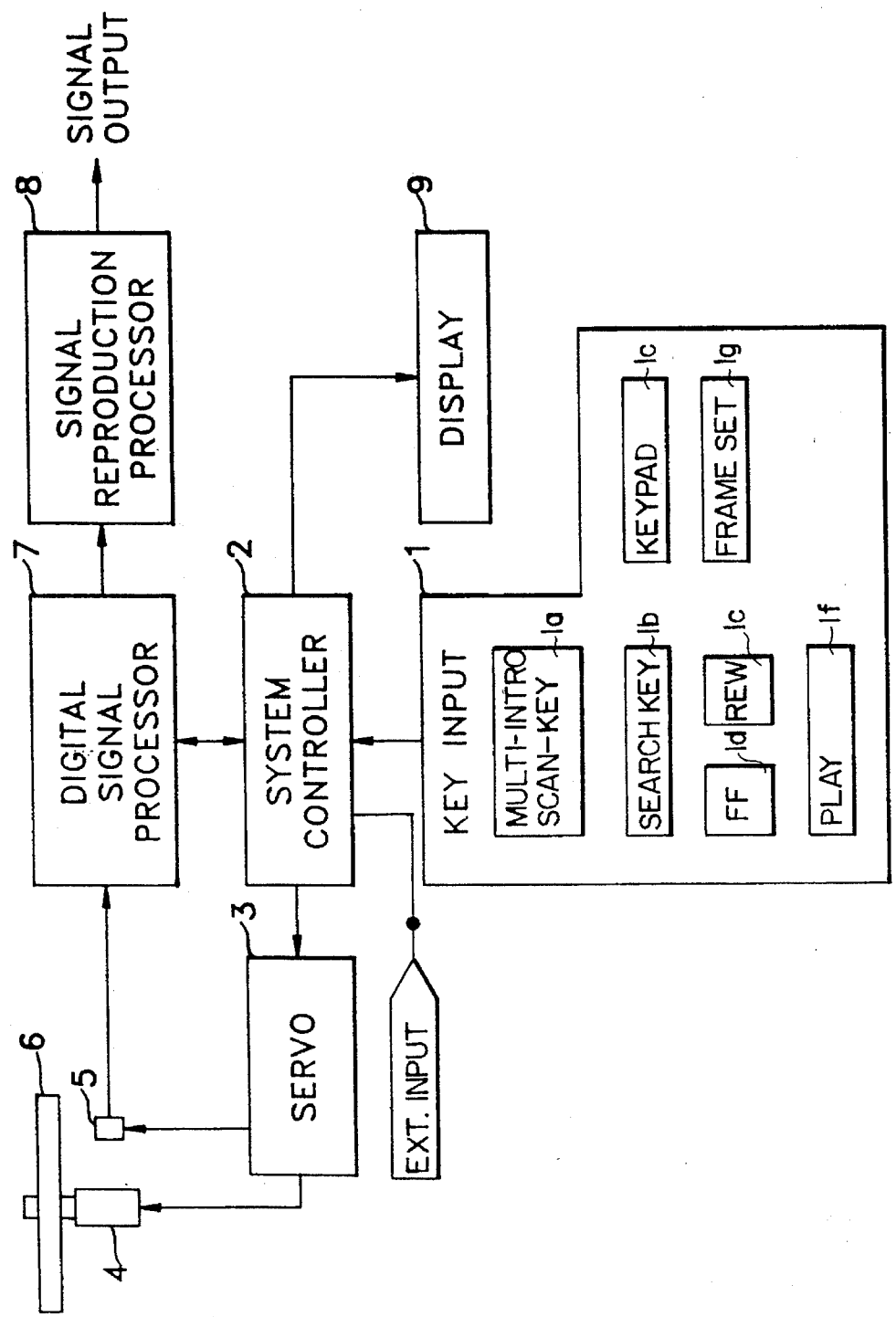
FIG. 2 is a schematic diagram of the disk reproduction apparatus adopting the present invention.

In FIG. 2, a key input 1 for applying a user's control instruction and information includes, in the present invention, function keys such as a multi-intro scan key 1a which can apply a program search control instruction, and a set key for providing information regarding a search interval or a time period.

A pickup 5 is used in recording or reproducing information on a disk 6. A spindle motor 4 controls the rotation of the disk 6. A servo 3 receives a control signal via system controller 2 according to the user's instruction applied from the key input 1 and controls the rotation of the spindle motor 4 and the operation of the pickup 5.

A digital signal processor 7 is advantageously provided for signal-processing the information recovered by pickup 5 into a digital form. According to the present invention, audio information and video information among the recovered information are separated from time information. Then the audio/video information is sent to the signal reproduction processor 8. The time information is output to the display 9 via the system controller 2, thereby enabling the present proceeding point with respect to time to be identified. The signal reproduction processor 8 reproduces the audio/video information applied after being processed into a digital signal and outputs this information via an output unit (not shown).

The system controller 2 is advantageously provided for controlling overall operation of the system according to control signals applied from the key input 1. System controller 2 performs a program search function according to the flowcharts shown in FIGS. 3, 5, 7 and 8, which will be described in detail below.

The program search method according to the present invention adopted in the disk reproduction apparatus having the configuration as described above will be described in detail with reference to the flowcharts of FIGS. 3, 5, 7 and 8. It will be appreciated that the present invention is formulated so that a program can be scanned irrespective of the presence or absence of chapter numbers.

Figure 4A:
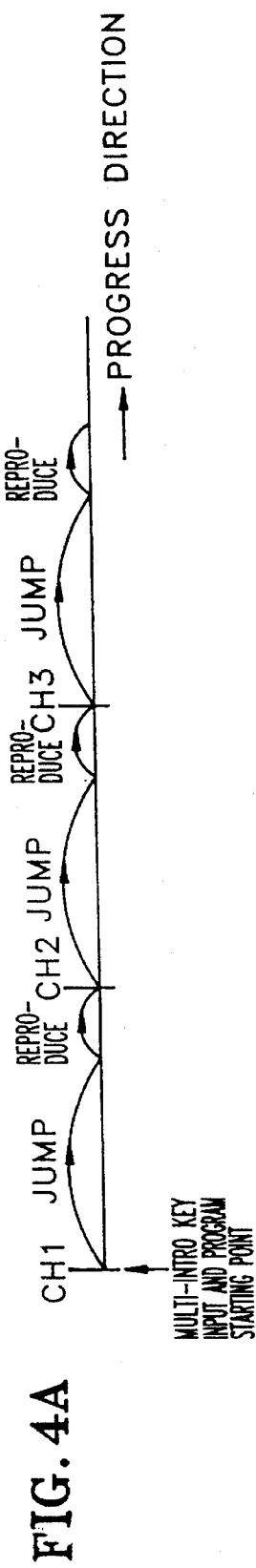
FIGS. 4A, 4B and 4C are illustrations which are useful in understanding the program search method shown in the flowchart of FIG. 3.

Before describing the specific embodiments according to the present invention, two cases, one for the case where chapter numbers are recorded on the disk and a second case where chapter numbers are not provided, will first be described with reference to FIGS. 4A to 4C. FIG. 4A illustrates the exemplary case where chapter numbers are recorded on a disk for differentiating portions of the program. It will be appreciated that there is a difference in the method of adapting the present invention for program search functions depending on the difference in format and rotation method used. Thus, the description of the disk should be divided again to address constant linear velocity and constant angular velocity disks. It will be appreciated that a disk player, which is generally an electronic apparatus which records a digital signal onto a disk, projects a highly concentrated light, such as a laser beam, on the surface of the disk and receives the reflected light, thereby enabling the signal to be reproduced according to the difference in the light intensity during the rotation of the disk. Preferably, the disk rotation method for recording and reproducing an image signal using a disk player can be divided again into a constant angular velocity rotation (CAV) type and a constant linear velocity (CLV) rotation type.

When the disk rotates at a constant angular velocity, the rotation speed of the disk when the pickup is located on the outermost track of the disk is the same as that of the disk when the pickup is located on the innermost track of the disk. Typically, the disk rotates at the velocity of 1,800 revolutions per minute (RPM) and the image signal of one frame is recorded on a track of the disk according to a signal recording format. In searching a CAV disk the head jumps a set number of frames from a present location and then reproduces a predetermined number of frames starting at this location. When the CAV disk is formatted by chapters, since the differentiation of each chapter is performed with respect to a predetermined number of frames, the intro scan reproduction according to chapter numbers is possible.

In other types of disks, in order to record a great deal of information, a signal is recorded at the same density on the outermost and innermost tracks of the optical disk. The recorded signal is then reproduced by rotating the disk at a constant linear velocity. Therefore, when the disk rotates, the rotation speed of the disk when the pickup is located on the outermost track is different from that of the disk when the pickup is located on the innermost track. Generally, a disk rotates at the velocity of about 1,800 RPM on the innermost track and about 600 RPM on the outermost track. Thus, since the motor speed for the outermost track is one third that at the innermost track, when considering the recording and reproducing times, it is possible to record three times as many image signals on the outermost track than can be recorded on the innermost track. During search of a CLV disk, tracks jump by the pickup are performed with respect to a set time from the present location and followed by reproduction of the signal during a predetermined reproduction period starting at the landing location of the pickup. When the CLV disk includes chapter numbers, since the differentiation of each chapter is determined with respect to a constant time, the intro scan reproduction according to the chapter numbers is possible.

It should be noted that when scanning for a desired picture during the operation according to the multi-intro scan function, if a reproduction key is pressed, the scan function is canceled and the picture currently being scanned is reproduced. When the multi-intro scan function is completed, the disk player advantageously stops.

The address area of a laser disk (or a video disk) has information such as a picture number indicating a particular video picture, a chapter number uniquely identifying a chapter (as in a book) thereby differentiating programs, a picture stop code for automatically stopping at a particular picture, a status code indicating the status of an associated audio signal, a control code indicating a lead-in area which is the starting point of the program and a lead-out area which is the ending point of the program, and a user defined code for monitoring the disk. For a CLV disk, there is additionally provided a time code. Using the codes recorded in the address area enables an automatic play or a random access. The codes are preferably recorded as bi-phase digital code signals on the 16th to 18th or the 279th to 281st horizontal scanning line in a vertical blanking period.

The operation according to the program search method for the exemplary case when no chapters and, hence, no chapter numbers are provided will now be described.

Figure 4B:
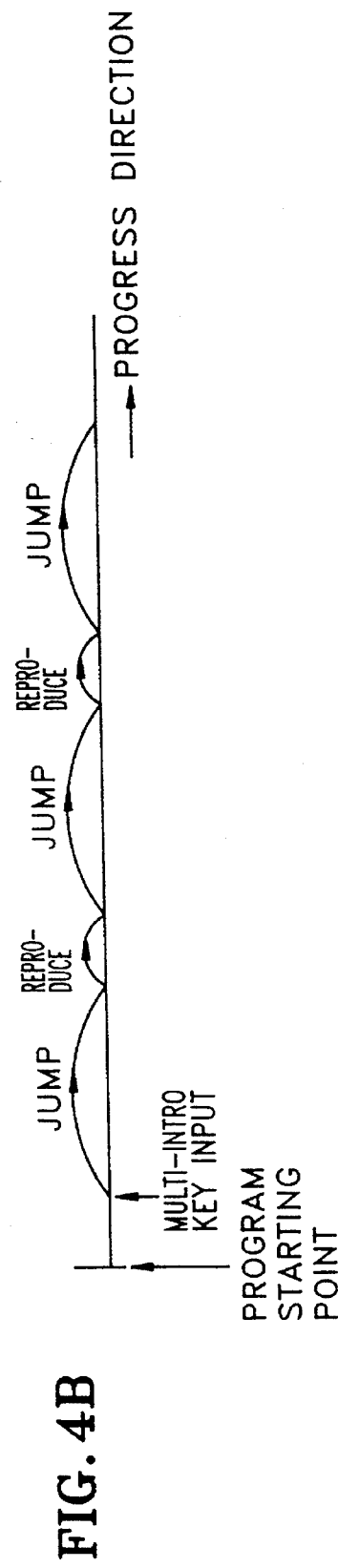
Figure 4C:
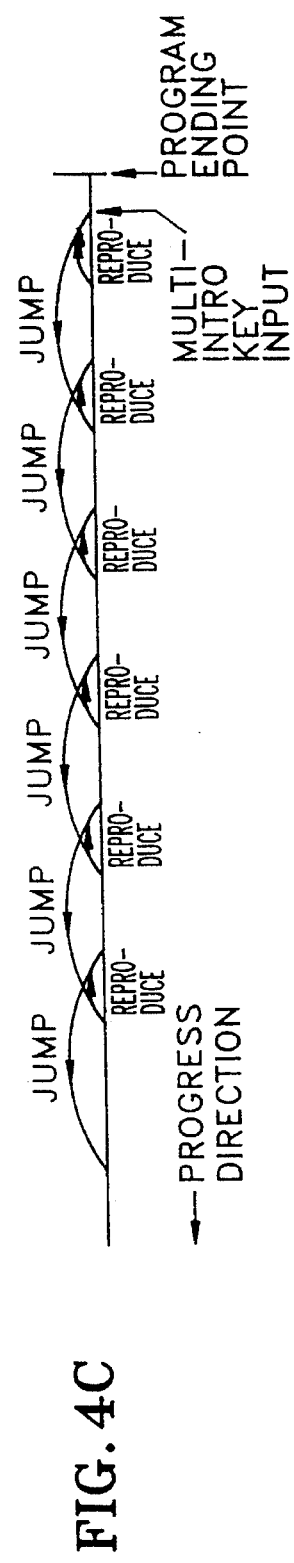

FIGS. 4B and 4C show the case without chapter numbers, from the start of the program to the end. That is to say, after the program starts, if the multi-intro scan key 1a is pressed during reproduction, and if the disk is a CAV disk, the number of frames set in the system controller 2 is jumped starting from the present location. Then a predetermined number of frames are reproduced from the corresponding resultant location. The operation can be repeatedly performed such that a predetermined number of frames is jumped and then a predetermined number of frames is reproduced starting at the corresponding location.

A multi-intro scan function is advantageously performed for the CLV disk using the same program search method as that described with respect to the CAV disk. However, when the disk is a CLV disk, the pickup is moved by a predetermined time set by the controller 2 and the reproduction of the part of the program corresponding to the predetermined time is repeatedly performed.

It will be appreciated that FIG. 4B shows an example of searching a program in the fast-forward direction when the multi-intro scan key 1a is operated and a desired program is located in the latter part of the disk, i.e., downstream of the present location. FIG. 4C shows an example of searching for a desired program in the rewind direction when the multi-intro scan key 1a is input and the desired program is located in the former part of the disk, i.e., upstream of the starting location.

Operation will now be described in detail with reference to the flowchart shown in FIG. 3 in connection with the apparatus shown in FIG. 2.

While a specific part of a disk is reproduced using pickup 5 in a disk reproduction apparatus (step 110), system controller 2 scans key input 1 periodically to check whether a key input signal is produced or not. If there is a key input, it is determined whether the corresponding input key is the multi-intro scan key 1a, which is used for the program operation according to the present invention during step 120. If the corresponding input key is not the multi-intro scan key 1a, a specific function, such as fast-forward, rewind, pause or stop, is performed during steps 130 and 140. If there is no input key, the current operation is continuously performed. If the input key is the multi-intro scan key 1a, the process proceeds to step 150.

During step 150, it is determined whether there is an input of a time search key 1b necessary for setting a search interval and for setting a reproductive period associated with a multi-intro scan function. If there is no input of the corresponding time search key 1b, step 150 is repeatedly performed. It is also possible to restrict the time in which to operate a key so that the multi-intro scan function is automatically canceled after a given time elapses during this step 150.

If the search or time set key 1b is input during step 150, step 160 for setting time is performed. In step 160, a specific time is input using the keypad 1c of key input 1. At this time, the time setting can be displayed on a screen using on-screen display function generally included with a digital processor, or on a liquid crystal display 9 built in the disk player.

When the time is set in such a manner, it is determined whether there is an input of the direction key for defining a direction during search step 170. If the input key is neither a FF key 1d nor a REW key 1e, step 170 is repeatedly performed until the corresponding key is input. As in step 150, when a given time elapses, the performance of the multi-intro scan function may be canceled.

If one of the FF or REW keys 1d, 1e is pressed during step 170, the multi-intro scan function is performed. That is to say, servo 3 makes pickup 5 jump from the input point of the multi-intro scan key 1a in the set direction in accordance with the control instruction of the system controller 2 by the set search interval depending on the search time and intro time period set in step 160 during step 180. Disk 6 is normally reproduced for a predetermined period starting from the jumped location during step 190.

The system controller 2 detects whether a key is pressed in key input 1 during the performance of the multi-intro scan function during step 200. When the corresponding key is a play or reproduction key 1f, the multi-intro scan function is terminated and a normal reproduction is performed starting from the present location during step 210. Preferably, in step 200, even if the play key 1f is not input, when the present area deviates from the program area of the disk while the multi-intro scan function is being performed, reproduction advantageously can be terminated. The multi-intro scan function may also be terminated if another key is pressed.

Steps 110 to 210 show the multi-intro scan function being performed according to time units in an exemplary case where the disk is a CLV disk. When the disk is a CAV-type disk, the units for searching or performing a multi-intro scan function will not be time but rather the number of frames.

That is to say, it is determined whether the frame set key 1g is input in step 150, the number of frames defining the search interval and the multi-intro scan function is set during step 160, and the set number of frames is jumped, starting from the present location. A predetermined number of frames from the resultant present location is normally reproduced for a predetermined reproduction period during steps 180 and 190.

Figure 5:
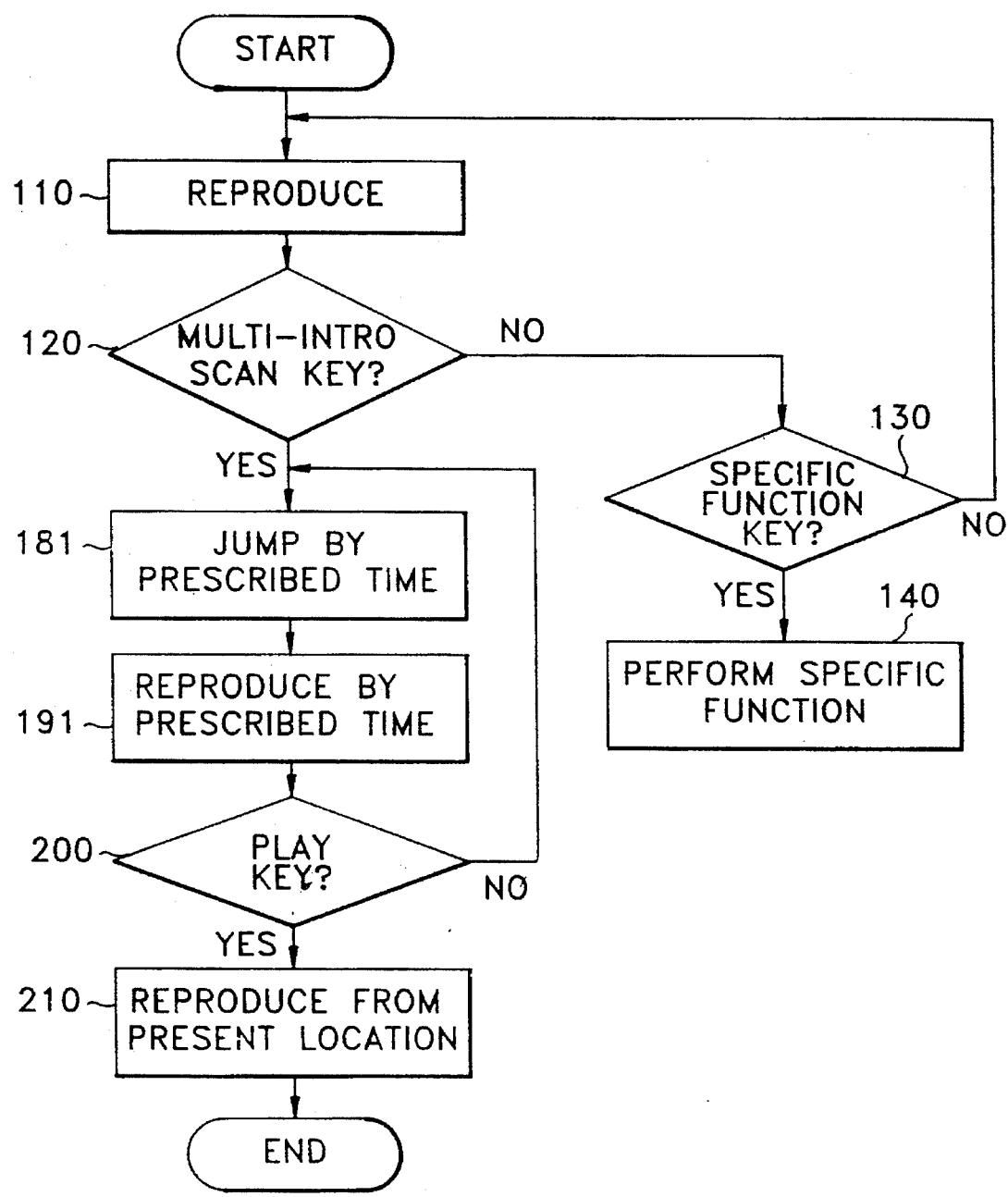
FIG. 5 is a flowchart of another program search method according to another embodiment of the present invention.

FIG. 5 is a flowchart showing another embodiment of the program search method according to the present invention, which is adaptable for both CLV and CAV disks. Here, for the sake of convenience, an exemplary case for the CLV disk will be described. It will be appreciated that the same steps as those shown in FIG. 3 are designated by the same reference numerals, and their description will be omitted in the interest brevity.

Figure 3:
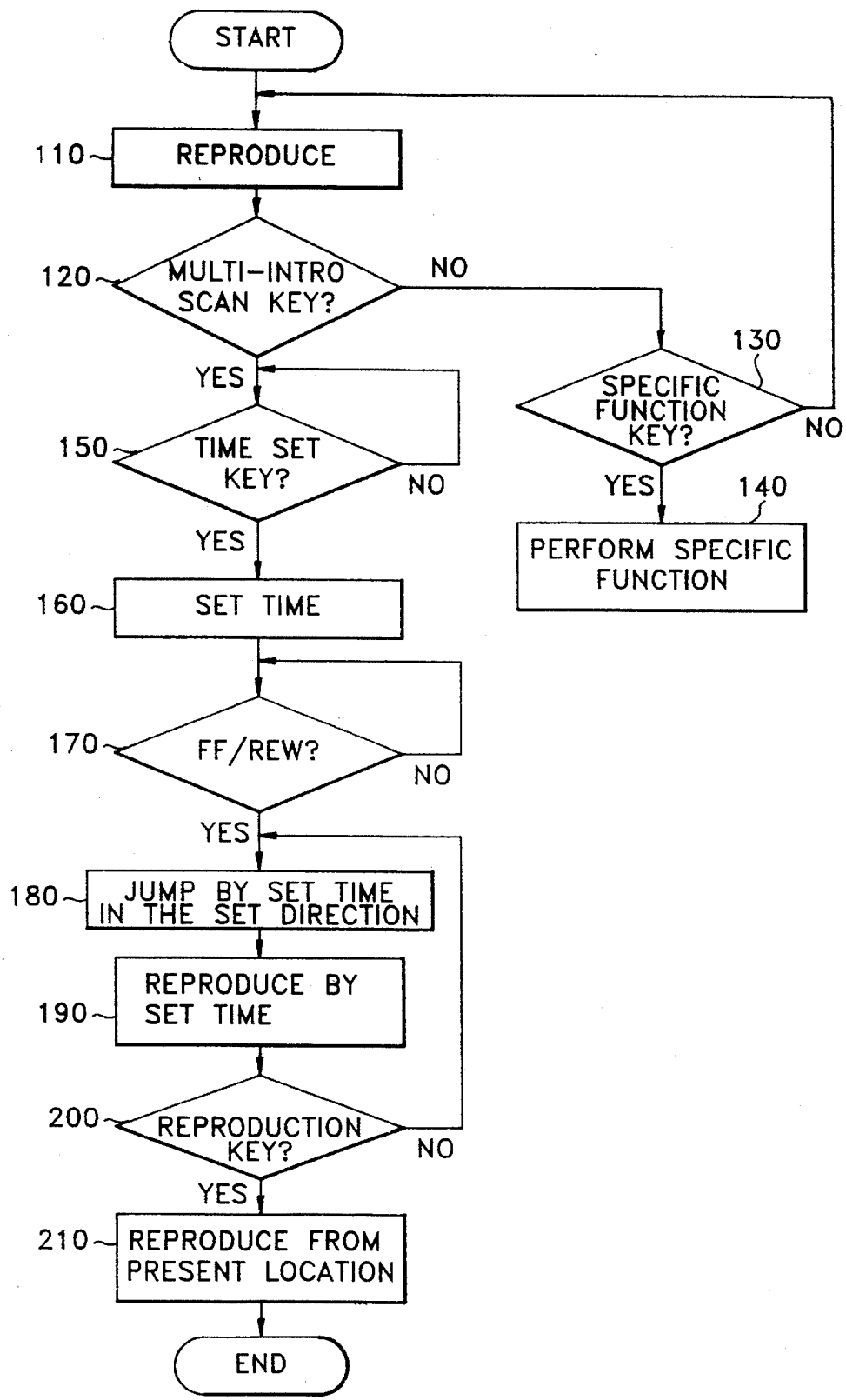
FIG. 3 is a flowchart of a program search method according to an embodiment of the present invention.

As described with respect to FIG. 3, the multi-intro scan function is performed by operating a direction key 1d, 1e. To simplify the steps, it is also possible to perform a search operation in a preprogrammed order, when the multi-intro scan key 1a is input during step 120. For example, a program prescribes that each jump made with respect to a CAV disk is defined as an interval of 5,000 frames and, after each jump, the program is then reproduced for a period of N seconds, as indicated in steps 181 and 191. In contrast, each jump for the CLV disk is equivalent to a play interval of five minutes while the reproduction period is equal to N seconds.

The example of the search therefore is as shown in FIG. 6A. Comparing FIG. 6A with FIG. 4B, the jump time and reproduction time shown in FIG. 4B are variable according to operated time set or search key 1b or frame number set key 1g is operated by a user while the operation shown in FIG. 6A is repeatedly performed according to a preprogrammed search interval and reproduction period.

Advantageously, it is also possible to program the operation to perform the jump over a search interval and to perform reproduction for a set period whereby steps 181 and 191 shown in FIG. 5 are performed from a starting point of the program recorded onto a disk as shown in FIG. 6B, and not from the input point of the multi-intro scan key 1a as shown in FIG. 6A.

Figure 7:
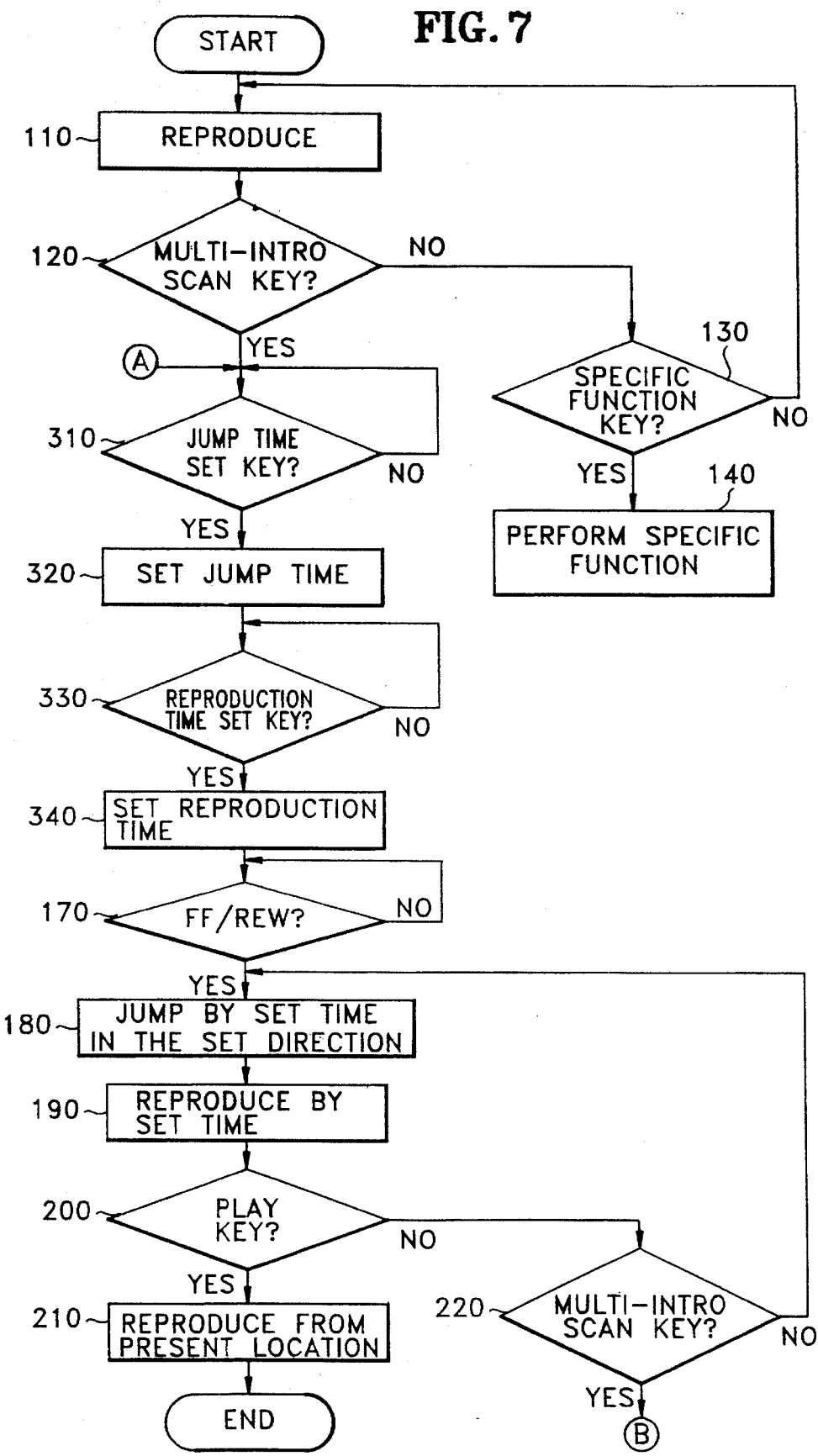
FIGS. 7 and 8 are flowcharts for additional program search methods according to still other preferred embodiments of the present invention.
Figure 8:
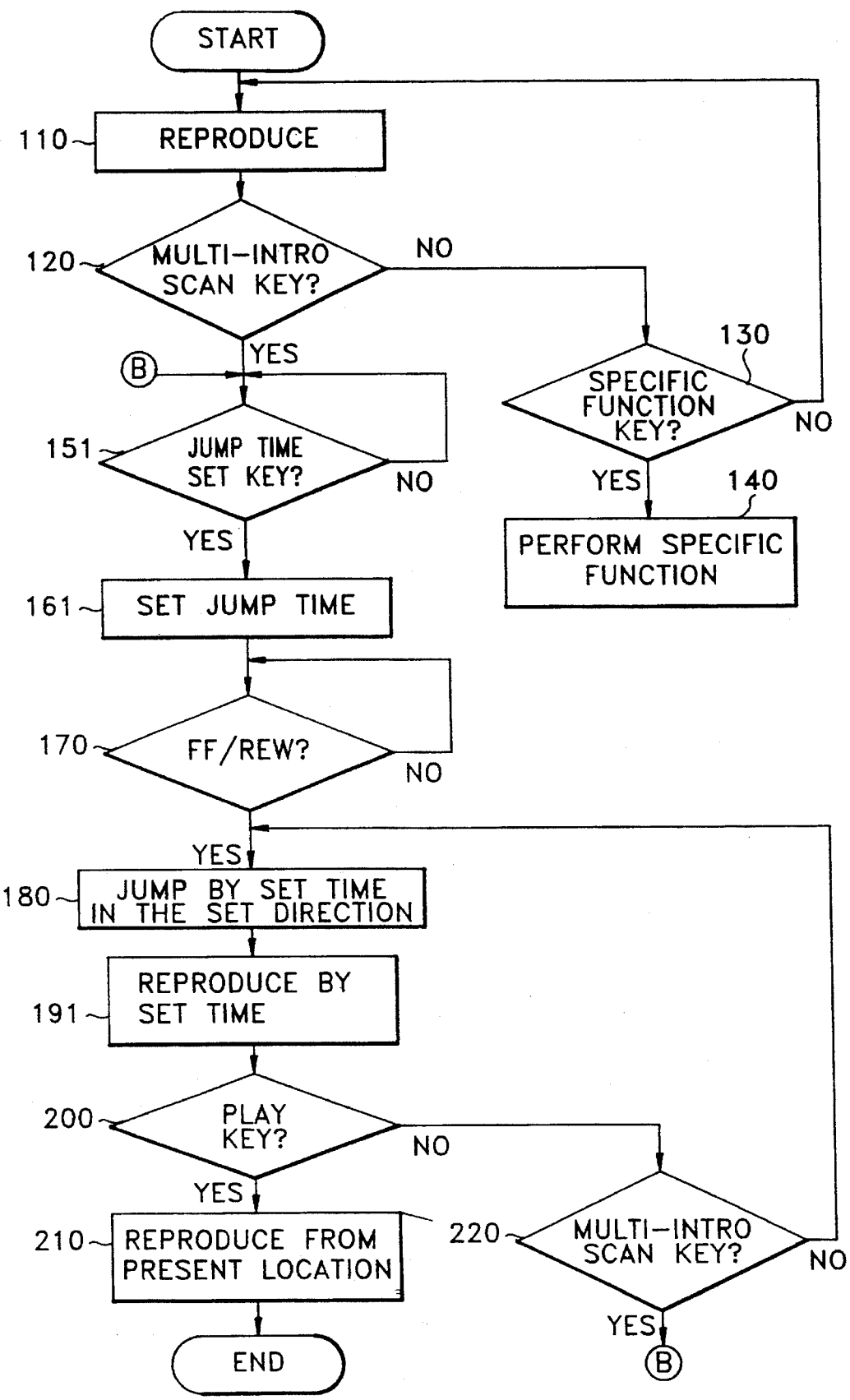

FIGS. 7 and 8 are flowcharts showing still another embodiment of the program search method according to the present invention. Here again, for the sake of the convenience, the exemplary case for a CLV disk will now be described. It will also be noted that the same steps as those shown in FIG. 3 are commonly designated by the same reference numerals; detailed discussions of common steps will be omitted.

In contrast with FIG. 3, in the steps 151 and 161 corresponding to step 150 for generating a time set key 1b and the step 160 for entering the desired search interval, the jump interval and the reproduction period can all be set according to received external key inputs at terminal 2a.

If the multi-intro scan key 1a is input during step 120, it is determined whether the jump time set key 1b is input during step 310. If the jump time set key 1b is not input, step 310 is repeated until the corresponding key is input. If the jump time set key 1b is input during the step 310, the jump time is set during step 320.

After the jump interval is set, it is determined whether the reproduction period is set using keypad 1c is input during step 330. If the reproduction period set key is not operated, step 330 is repeated until a corresponding key is input. When the reproduction period set signal is received during step 330, the reproduction period is set during step 340. If there is no input of a corresponding key, i.e., either a time set or search key 1b or frame number set key 1g even after a given time elapses during steps 310 and 330, the performance of the multi-intro scan function may advantageously be canceled.

The set search interval from the present location is jumped in the direction set in step 170 according to the search interval and reproduction period set during steps 320 and 340 during step 180 and a normal reproduction is performed for the indicated reproduction period from the resultant jumped location during step 190.

If the play key 1f is input during the performance of the multi-intro scan function during step 200, the multi-intro scan function is terminated and a normal reproduction is performed from the present location during step 210.

When a key other than the play key 1f is input during the step 200, it is again determined whether the multi-intro scan function key 1a is input. If the multi-intro scan function key 1a is input during step 200, the process goes back to step 310 where it is determined whether a key 1b for setting the jump interval is input.

FIG. 8 shows still another embodiment of the program search method according to the present invention. Comparing FIG. 8 with FIG. 7, the significant difference is that after the multi-intro scan key 1a is input, the jump interval is set according to external inputs received via input terminal 2a of controller 2 during steps 151 and 161. The set interval is then used to jump from the point corresponding to the input of the multi-intro scan key 1a. The reproduction is then performed starting from the jumped location for the set period programmed previously. Preferably, the reproduction period can be set according to external input during step 151 shown in FIG. 8, and the jump can be performed for the set programmed previously in the step 180.

The search methods shown in FIGS. 7 and 8 are similar to that shown in FIG. 3. However, when the part to be searched is passed over during the program search, a function is advantageously added so that if the search instruction is again given, tracks are jumped again in the reverse direction from that of the present ending point of the reproduction and the program reproduction is performed from the new jumped location. An example of the program search method of FIGS. 7 and 8 is shown in FIG. 9.

When the initially set interval, defined in terms of time or number of frames, is repeatedly reproduced and jumped after jumping in a reverse direction, the portion to be searched, i.e., a desired location may be passed over. Therefore, it is desirable to perform the jump and reproduction function using a smaller interval and a smaller period than the previously set interval and period, respectively, when the search instruction is again given during the search operation. Thus, the jump interval and reproduction period shown in FIG. 7 or the jump interval as shown in FIG. 8 can be arbitrarily set by the user. Additionally, steps 310 to 340 shown in FIG. 7 or the steps 151 and 161 shown in FIG. 8 can be also adopted in the steps 150 and 160 shown in FIG. 3.

Although the present invention has been described with the example of repeated performance in the order of jump-reproduction-jump-reproduction, the order can be changed to that of reproduction-jump-reproduction-jump.

Compared to the conventional method in which the intro function is performed by each chapter of the programs recorded onto a disk, since the program search method according to the present invention performs the search and multi-intro scan function by a search interval defined by time or number of frames, the multi-intro scan function can be performed even if there is no chapter differentiation between programs.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A program search method for a digital signal processor which reproduces a program recorded on a recording medium, irrespective of the presence of chapter information or track information indicating a program position, said method comprising the steps of:

(a) setting a predetermined search interval and a predetermined reproduction period according to respective external inputs for a program search;

(b) jumping from a present location to a desired location separated by said predetermined search interval established during said step (a);

(c) reproducing the program on the recording medium for said predetermined reproduction period set during said step (a) after performing said step (b); and (d) repeatedly performing said steps (b) and (c) until the beginning of a user's desired program is reached.

2. The program search method as claimed in claim 1, further comprising the step of (e) setting a search direction of the program search after performing said step (a).

3. The program search method as claimed in claim 2, further comprising the steps of:

(f) stopping the program search; and (g) performing reproduction starting from a final location when a reproduction instruction is applied by a user during said step (d).

4. The program search method as claimed in claim 2, further comprising the step of:

(h) jumping by a second predetermined interval in a reverse direction with respect to jumping in accordance with said step (b); and (i) then reproducing said program for said reproduction period when a search instruction is received during performance of said step (d).

5. The program search method as claimed in claim 1, wherein said search interval is defined in time units.

6. The program search method as claimed in claim 1, wherein said search interval is defined in frame units.

7. A program search method for a digital signal processor which reproduces a program recorded on a recording medium, irrespective of the presence of chapter information or track information indicating a program position, said method comprising the steps of:

(a) jumping from a first location to a second location separated by a predetermined interval in accordance with a received program search instruction;

(b) reproducing the program recorded on the recording medium for a predetermined reproduction period after performing said step (a); and (c) repeatedly performing said steps (a) and (b) until the beginning of a user's desired program is reached, wherein said first location in said step (a) corresponds to present location at which said program search instruction is received.

8. The program search method as claimed in claim 7, wherein said search interval is defined in frame units when said recording medium is a constant angular velocity (CAV) disk.

9. The program search method as claimed in claim 7, wherein said search interval is defined in time units when said recording medium is a constant linear velocity (CLV) disk.

10. A program search method for a digital signal processor which reproduces a program recorded on a disk, irrespective of the presence of chapter information or track information indicating a program position, said method comprising the steps of:

(a) setting a predetermined search interval in accordance with a respective external input in which a program search instruction is received;

(b) jumping from a present location to a desired location separated therefrom by the predetermined search interval set during said step (a);

(c) reproducing a portion of said program for a previously set reproduction period after performing said step (b); and (d) repeatedly performing said step (b) using said search interval and said step (c) using said set reproduction period until the beginning of a user's desired program is reached.

11. The program search method as claimed in claim 10, further comprising the step of (e) defining a direction for performing said program search after performing said step (a).

12. The program search method as claimed in claim 11, further comprising the steps of:

(f) stopping the program search; and (g) performing program reproduction starting from a final location based on reception of a reproduction instruction applied by a user-during performance of said step (d).

13. The program search method as claimed in claim 10, further comprising the steps of:

(h) jumping by a predetermined second search interval in a reverse direction defined with respect to said search interval used during said step (b); and (i) then reproducing said program for said reproduction period when said search instruction is again received during performance of said step (d).

14. The program search method as claimed in claim 10, wherein said search interval and said reproduction period are defined in frame units when said disk is a constant angular velocity (CAV) disk.

15. The program search method as claimed in claim 10, wherein said search interval and said reproduction period are defined in time units when said disk is a constant linear velocity (CLV) disk.

* * * * *